US008610536B2

(12) United States Patent
Libby et al.

(10) Patent No.: US 8,610,536 B2
(45) Date of Patent: Dec. 17, 2013

(54) BEVERAGE DISPENSING CONTROL

(75) Inventors: Jeffrey Isaac Libby, Atlanta, GA (US); Jeffrey Lin Portman, Jr., Atlanta, GA (US); Andrew Hill Adams, Tucker, GA (US); Howard Lott Paulk, Cumming, GA (US)

(73) Assignee: Table Tap, L.L.C., Roswell, GA (US)

( * ) Notice: Subject to any disclaimer, the term of this patent is extended or adjusted under 35 U.S.C. 154(b) by 826 days.

(21) Appl. No.: 12/793,949

(22) Filed: Jun. 4, 2010

(65) Prior Publication Data

US 2011/0298583 A1 Dec. 8, 2011

(51) Int. Cl.

| | |
|---|---|
| ***G05B 19/00*** | (2006.01) |
| ***G05B 23/00*** | (2006.01) |
| ***G08B 21/00*** | (2006.01) |
| ***G08B 13/00*** | (2006.01) |
| ***G05D 7/00*** | (2006.01) |
| ***G06F 17/00*** | (2006.01) |
| ***G06K 5/00*** | (2006.01) |
| ***A47J 31/40*** | (2006.01) |
| ***G06F 11/00*** | (2006.01) |

(52) U.S. Cl.

USPC .......... 340/5.28; 340/5.2; 340/5.61; 340/618; 340/541; 700/283; 700/236; 235/380; 99/280; 702/188

(58) Field of Classification Search

USPC ................ 340/5.28, 5.2, 5.61, 612, 618, 541, 340/825.25; 700/283, 236, 231, 299, 232, 700/244; 235/380, 381, 382.5, 383; 222/129, 129.1, 129.3, 129.4, 25, 28; 99/280

See application file for complete search history.

(56) References Cited

U.S. PATENT DOCUMENTS

| | | | | |
|---|---|---|---|---|
| 4,237,536 | A * | 12/1980 | Enelow et al. | 705/413 |
| 5,659,482 | A | 8/1997 | Warn et al. | |
| 6,045,007 | A * | 4/2000 | Simmons | 222/146.6 |
| 6,056,194 | A * | 5/2000 | Kolls | 235/381 |
| 7,455,223 | B1 * | 11/2008 | Wilson et al. | 235/381 |
| 2004/0261624 | A1 * | 12/2004 | Lassota | 99/280 |
| 2007/0204930 | A1 * | 9/2007 | Phallen et al. | 141/83 |
| 2007/0239549 | A1 | 10/2007 | LaFauci et al. | |
| 2008/0189078 | A1 * | 8/2008 | Vok et al. | 702/188 |
| 2009/0157515 | A1 * | 6/2009 | Lafauci et al. | 705/15 |
| 2009/0177318 | A1 * | 7/2009 | Sizemore | 700/236 |

* cited by examiner

*Primary Examiner* — Jennifer Mehmood
*Assistant Examiner* — Mirza Alam
(74) *Attorney, Agent, or Firm* — Fish & Richardson P.C.

(57) ABSTRACT

Methods, systems, and apparatus, including computer programs encoded on a computer storage medium, for control of beverage dispensing. In one aspect, authorization data specifying that a beverage dispensing node is authorized to be activated are received. Activation data that request activation of the node are also received, where activation of the node causes a valve that controls flow of fluid to a beverage dispenser to be opened. A determination is made that the activation data are associated with a user identifier for an enabled user, where an enabled user is a user that has been enabled to activate the node. In response to receipt of the authorization data and the activation data a valve that controls flow of fluid to the beverage dispenser is opened. Data (e.g., de-authorization or de-activation data) specifying that an activated beverage dispensing apparatus be de-activated can also be received. In response to receipt of the data, the valve can be closed.

31 Claims, 5 Drawing Sheets

BEVERAGE DISPENSING CONTROL

BACKGROUND

This specification relates to beverage dispensing.

Many businesses, such as restaurants, bars, and other businesses (e.g., sports venues and concert venues) dispense beer and other alcoholic and non-alcoholic beverages to customers. Businesses that dispense beer and other alcoholic beverages dispense these beverages according to dispensing rules. Some of these dispensing rules are dictated by local or national law, while other rules are self-imposed or dictated by an organization that is associated with an event.

For example, laws related to alcoholic beverage dispensing may require businesses that dispense alcoholic beverages to only do so during specified days and/or hours. Similarly, an organization, such as a professional football or basketball organization may specify that venues at which games are played (or at which other events occur) can only dispense alcoholic beverages during specified times (e.g., during a specified portion of the game.

Businesses can face large fines and/or civil liability for failing to comply with the dispensing rules. Therefore, many businesses that dispense alcoholic beverages may spend time and money training personnel and may employ additional supervisory employees to ensure that the dispensing rules are followed. While training and additional supervisory employees can reduce the chance that the dispensing rules are followed, many businesses rely solely on these employees to ensure that the dispensing rules are followed.

In addition to the fines and liability that businesses can face for not following dispensing rules, businesses that dispense alcoholic beverages may experience a higher than desired level of wastage (e.g., over-pours) and/or theft, which can reduce the overall profitability of the business. The risk of non-compliance with dispensing rules and the losses associated with wastage and theft can be reduced using a beverage dispensing apparatus that enables monitoring and control of beverages being dispensed by a business.

SUMMARY

In general, one innovative aspect of the subject matter described in this specification can be embodied in methods that include the actions of receiving authorization data specifying that a beverage dispensing node is authorized to be activated; receiving activation data that requests activation of the node, wherein activation of the node causes a valve that controls flow of fluid to a beverage dispenser to be opened; determining that the activation data are associated with a user identifier for an enabled user, the enabled user being a user that has been enabled to activate the node; and in response to receipt of the authorization data and the activation data, opening a valve that controls flow of fluid to the beverage dispenser.

These and other embodiments can each optionally include one or more of the following features. Methods can further include the actions of receiving data specifying that an activated beverage dispensing apparatus be de-activated; determining that the received data are associated with a user identifier for an enabled user, the enabled user being a user that has been enabled to de-activate the beverage dispensing apparatus; and in response to receipt of the data, closing a valve that controls flow of fluid through the beverage dispensing apparatus. Receiving data can include receiving de-authorization data specifying that the beverage dispensing apparatus is no longer authorized to be activated. Receiving data can include receiving de-activation data specifying that the beverage dispensing apparatus is disabled for beverage dispensing.

Opening a valve can include opening an electronic control valve that controls flow of fluid to the beverage dispenser. Opening the electronic control valve can include actuating a strike and hold valve that opens in response to a minimum specified current and remains open as long as a second current is maintained, the second current being less than the minimum specified current.

Methods can further include the actions of determining that the activation data has been received during a valid period, the valid period being a period during which activation data are considered valid, wherein opening a valve comprises actuating the valve in response to (a) receipt of the authorization data, (b) the determination that the activation data are associated with a user identifier for a user, and (c) the determination that the activation data has been received during the valid period.

Determining that the activation data has been received during a valid period can include the actions of receiving a schedule of one or more valid periods; and determining that the time at which the activation data was received was during a valid period according to the schedule of one or more valid periods. Receiving a schedule of one or more valid periods can include receiving an event schedule for an event venue, each event in the event schedule having a start time representing a start of the valid period for the event and a stop time representing an end of the valid period for the event. The stop time for the event can be a time prior to the end of the event. The stop time can be a time at which a specified event occurs. Methods can further include the action of receiving stop time data from a game clock for a game, the stop time data specifying that the game progression has reached a time at which beverage dispensing is restricted.

Methods can further include the actions of receiving configuration data that specifies dispensing rules for a location at which the beverage dispensing node is located; and controlling beverage dispensing according to the dispensing rules for the location. Receiving configuration data can include receiving data specifying a per-person dispensing limit. Controlling beverage dispensing can include closing the valve that controls flow of fluid to the beverage dispenser in response to the per-person dispensing limit being met.

Methods can further include the actions of tracking an amount of fluid that has been dispensed by the beverage dispenser; and providing reporting data specifying the amount of fluid that has been dispensed by the beverage dispenser. Providing reporting data can include providing the reporting data according to a reporting schedule, in response to a request for the reporting data, or in response to a change in the amount of fluid dispensed.

Methods can further include the actions of monitoring system diagnostics for a system in which the beverage dispensing node is installed; and providing diagnostic data specifying the system diagnostics. Providing diagnostic data can include providing data specifying at least one of a flow meter operating condition, a measure of available memory, a valve status, a beverage temperature, a beverage dispenser status, a fluid pressure, and a beverage container status. Providing the diagnostic data comprises providing the diagnostic data by at least one of e-mail and text message.

Receiving the authorization data can include receiving the authorization data from a user device that is registered on a different local area network than the data processing apparatus. Receiving the authorization data can include receiving the authorization data from a mobile device communicating over a mobile communications network. Other embodiments of this aspect include corresponding systems, apparatus, and computer programs, configured to perform the actions of the methods, encoded on computer storage devices.

Another innovative aspect of the subject matter described in this specification can be embodied in methods that include the actions of receiving data specifying that an activated beverage dispensing apparatus be de-activated; determining that the received data are associated with a user identifier for an enabled user, the enabled user being a user that has been enabled to de-activate the beverage dispensing apparatus; and in response to receipt of the data, closing a valve that controls flow of fluid through the beverage dispensing apparatus. These and other embodiments can each optionally include one or more of the following features. Receiving data can include receiving de-authorization data specifying that the beverage dispensing apparatus is no longer authorized to be activated. Receiving data can include receiving de-activation data specifying that the beverage dispensing apparatus is disabled for beverage dispensing. Receiving data can include receiving, from a mobile communications device communicating over a mobile communications network, data specifying that an activated beverage dispensing apparatus be de-activated. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Beverage dispensing can be controlled and monitored remotely using user devices that are connected to a distributed network. Increased beverage dispensing accountability can be achieved by requiring an enabled user to provide activation data prior to activating a dispensing apparatus. Multiple levels of authorization can be used to reduce the likelihood that beverages are dispensed outside of valid periods. A dispensing apparatus can operate autonomously from a network server using configuration data that is provided to the beer dispensing apparatus. Reporting data can be more reliably provided by configuring beer dispensing apparatus in a mesh configuration so that multiple communication paths are available for providing the reporting data.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
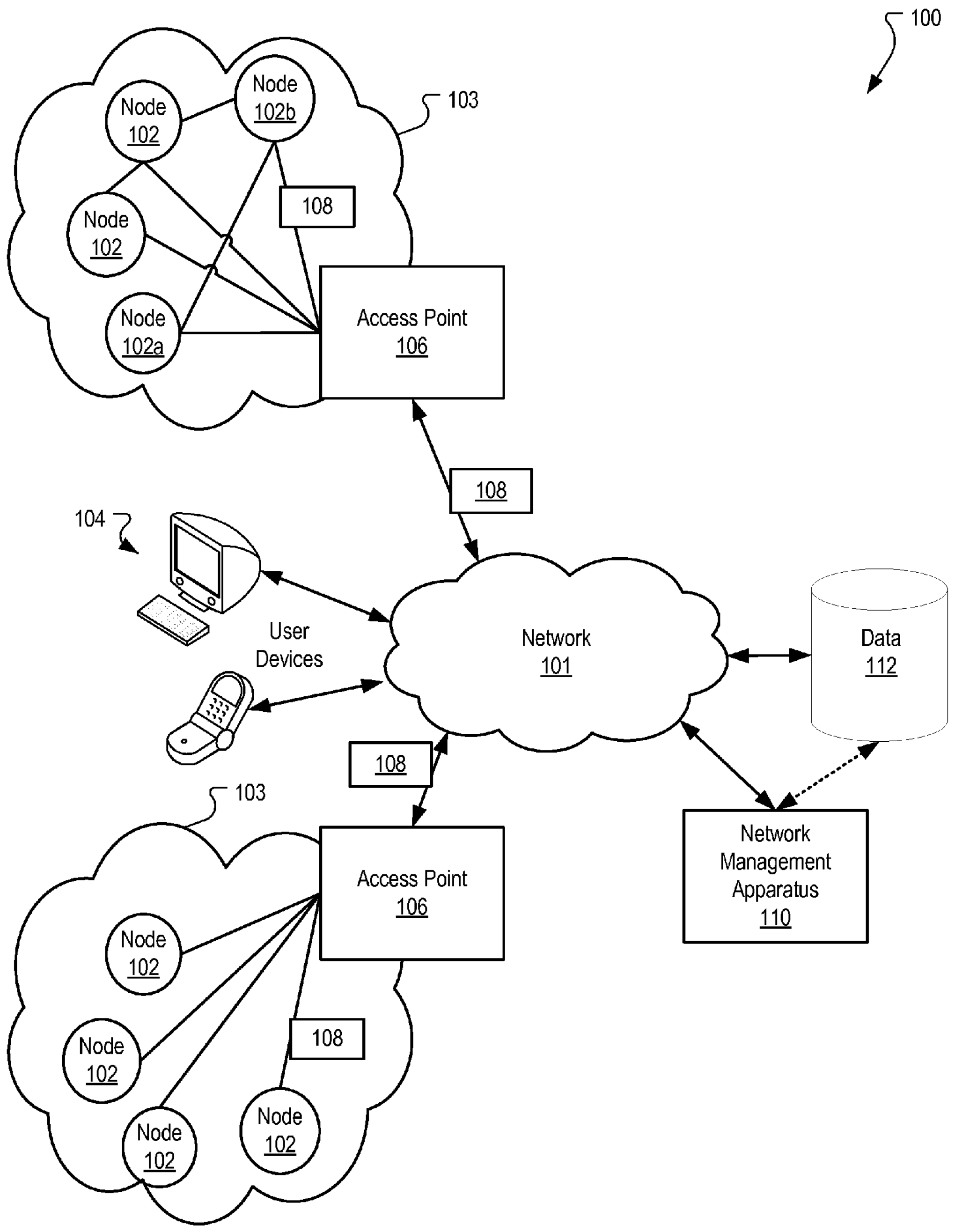
FIG. 1 is an example environment in which beverage dispensing can be controlled.

Beverage dispensing is controlled and monitored over a distributed network (e.g., the Internet). In some implementations, beverage dispensing is activated/de-activated (i.e., enabled/disabled) in response to receiving authorization/de-authorization data and/or activation/de-activation data. Authorization data are data specifying that activation of a beverage dispensing apparatus is authorized. De-authorization data are data specifying that activation of a beverage dispensing apparatus is de-authorized. Activation of the beverage dispensing apparatus causes a valve that controls flow of fluid to a beverage dispenser (e.g., a beer tap) to be opened, while de-activation of the beverage dispensing apparatus causes the valve to be closed. Activation/de-activation data are data that request activation/de-activation of the beverage dispensing apparatus. In some implementations, beverage dispensing is only activated when the activation data are associated with a user identifier for a user that is enabled to activate the beverage dispensing apparatus. In other implementations, any activation data can activate the beverage dispensing apparatus. In some implementations, activation data are only valid during a specified valid period, such that the beverage dispensing apparatus can only be activated during the valid period (e.g., operating hours of a restaurant, during a scheduled event, or another specified period). In other implementations, activation data are valid irrespective of the time at which the activation data are received.

Once the beverage dispensing apparatus has been activated, the flow of fluid through the beverage dispensing apparatus can be measured, for example, by a flow meter. In turn, reporting data (i.e. data that specifies the amount of fluid that has been dispensed by the beverage dispensing apparatus) can be provided to a user device (e.g., a computer, mobile communications device, or another user device), for example, by e-mail, text message, or another manner of communicating information. Additionally, diagnostic data (i.e., data specifying system diagnostics for a system in which the beverage dispensing apparatus is implemented) can be provided to a user device. For example, the diagnostic data that is provided can specify an operating condition for the flow meter that is measuring the flow of fluid, a temperature of the fluid, a pressure of the fluid, and other diagnostic information.

The beverage dispensing apparatus can be de-activated in response to expiration of the valid period, receiving de-activation or de-authorization data, and/or determining that a threshold amount of fluid has been dispensed. De-activation of the beverage dispensing apparatus causes the valve that controls the flow of fluid to the beverage dispenser to be closed. Once the beverage dispensing apparatus has been de-activated, it can remain de-activated until new instances of the authorization and activation data are received.

Control and monitoring of beverage dispensing is described below with reference to controlling and monitoring dispensing of beer. The systems, apparatus, and methods described below can be implemented to dispense other beverages and/or other fluids. The systems, apparatus, and methods described below can also be implemented to control the flow of other materials (e.g., gases) through other distribution systems. Additionally, a beverage dispensing system is described as a distributed system that communicates over a distributed network, but the beverage dispensing system can be implemented in a local area network or with elements of the system being directly coupled together.

FIG. 1 is an example environment 100 in which beverage dispensing can be controlled. The example environment 100 includes a network 101, such as a local area network (LAN), a wide area network (WAN), the Internet, or a combination thereof. The network 101 connects nodes 102, user devices 104, access points 106, and a network management apparatus

110. The example environment 100 may include many thousands of nodes 102 and user devices 104.

The nodes 102 are beverage dispensing apparatus that control beverage dispensing. As described with reference to FIG. 2, each node 102 can be a beverage dispensing apparatus that includes one or more beverage dispensers (e.g., beer taps), one or more valves to control the flow of fluid (e.g., beer) to the beverage dispensers, one or more controllers that actuate the valves, as well as input/output interfaces (e.g., RFID interfaces). Each node 102 can also include a data processing apparatus (e.g., a thin client, controller, or combination thereof) that sends and receives data 108 through a localized network 103 (e.g., a local area network). In some implementations, the nodes 102 are configured to send and receive data directly through the network 101. In other implementations, the nodes 102 send and receive data through access points 106 (e.g., a wireless access point). The description that follows describes particular components of the nodes 102 that can be used to perform particular functions. However, it should be appreciated that the functions can be performed by other components in the nodes 102, and that components of the nodes 102 can be combined in different configurations than those shown.

The data 108 that are received by the nodes 102 can include configuration data specifying beverage dispensing rules for a location at which the nodes are installed. The beverage dispensing rules can include rules that ensure compliance with applicable dispensing laws and regulations. For example, the dispensing rules can specify a threshold (e.g., a maximum) amount of beer that can be dispensed to an individual over a specified period of time (e.g., 20 minutes, one hour, or one day). The dispensing rules can also specify location/event specific dispensing guidelines. For example, as described in more detail below, the dispensing rules can also specify beverage dispensing guidelines for dispensing beverages during events such as sporting events, concerts, and other events. Using the received data, the data processing apparatus for a node 102 can control beverage dispensing according to the dispensing rules, as described below.

The data 108 that are sent (i.e., transmitted) by the nodes 102 can include reporting data and diagnostic data. The reporting data for each node 102 can specify an amount of fluid that has been dispensed by the node 102 and/or a type of fluid (e.g., brand of beer or wine) that has been dispensed by the node 102. The amount of fluid dispensed can be, for example, an absolute amount of fluid ever dispensed by the node 102, an amount of fluid dispensed since the last transmission of reporting data by the node, or another absolute or relative measure of fluid dispensed (e.g., a measure of fluid/time).

The data 108 that are sent by the nodes 102 can be encoded according to user datagram protocol (UDP) or another protocol. UDP is a stateless protocol that does not require handshaking. Using UDP to encode the data that is transmitted by the nodes 102 enables a large number of nodes to communicate over the network 101 without overloading a server to which the nodes 102 are transmitting the data or access points 106 through which the data packets are routed. Using UDP to encode the data also enables near real-time reporting of data 108 by the nodes.

Access points 106 are data processing apparatus that facilitate data transmission from a localized network 103 to another network 101. Access points can include, for example, routers, servers, wireless access points, data repeaters, a node 102 or any other data processing apparatus that facilitates data transmission through the network 101.

In some implementations, the nodes 102 are configured in a mesh architecture. In these implementations, each of the nodes 102 can transmit data bits and data packets throughout the localized network 103. For example, if a packet that is to be transmitted through the network 101 originates in node 102*a*, it may be transmitted through node 102*b* before being received at the access point 106. Configuring the nodes 102 in a mesh architecture facilitates balancing of computing resources and increases the reliability of the localized network 103. For example, assume that memory resources for node 102*a* are nearing capacity. In this example, if the node 102*a* is unable to transmit data 108 directly to the access point 106 or to a data processing apparatus in the network 101, the node 102*a* can transmit data to another node (e.g., b) that can, in turn, transmit the data to the access point 106 and/or store the data until the data 108 can be transmitted to the access point 106.

The environment 100 includes a network management apparatus 110 and a data store 112. The network management apparatus 110 and the data store 112 can each be implemented as elements in a cloud computing environment. The network management apparatus 110 is a data processing apparatus (e.g., a server or another cloud computing apparatus) that interacts with the nodes 102 to configure the nodes 102 to control beverage dispensing according to dispensing rules. For example, the network management apparatus 110 can receive a request to configure the node 102 according to the dispensing rules for the location at which the node is installed. In response to the request, the network management apparatus 110 can select data with which the node 102 is configured and provide the selected data to the node 102. The network management apparatus 110 can select the data with which the node 102 can be configured, for example, from data store 112.

The data store 112 is a data storage apparatus storing data with which the nodes 102 are configured (i.e., configuration data), and also storing data that is reported by (i.e., received from) the nodes 102. The data reported by the nodes can include, for example, reporting data and/or diagnostic data. In some implementations, the data store 110 includes an index of node identifiers representing the nodes, locations at which nodes are installed (or will be installed), and dispensing rules for the location. In these implementations, when a request for configuration data are received from a node 102 that is installed at a particular location, the configuration data that is associated with that particular location can be selected from the index and provided to the node 102 for which the configuration data was requested. Data that is indexed according to (e.g., stored at a memory location assigned to) a particular node, a particular location, or any other reference data is referred to as being associated with the particular node, particular location, or reference data.

The configuration data can include data specifying one or more types of data upon which activation of the node 102 is conditioned (i.e., data that must be received for the node 102 to be activated for beverage dispensing). In some implementations, the configuration data specify that authorization data and activation data must both be received by the node 102 for the node to be activated. As described in more detail with reference to FIG. 4, authorization data can be received from a user device under the control of a node administrator (e.g., a manager of a location). For example, the node administrator can interact with the user device to cause the user device to transmit authorization data to the nodes 102. In this example, following receipt of the authorization data, the nodes 102 are authorized to be activated, but still require receipt of activation data prior to being activated. The activation data can be received, for example, from a user device under the control of a server (or supervisor) that has been assigned to monitor beverage dispensing and/or dispense beverages using the node 102. For example, a supervisor that is responsible for beverages dispensed from one or more nodes 102 can use an RFID (radio frequency identification) card or another device to activate each of the nodes 102 for which the supervisor is responsible, as described in more detail with reference to FIG. 4.

In some implementations, the configuration data also specifies that the authorization data and/or the activation data must be received during a valid period (i.e., a period during which activation data and/or authorization data are considered valid). In these implementations, the validity of received authorization and/or activation data is conditioned based on the valid period.

For example, assume that beverage dispensing is restricted to (i.e., allowed during) the first three quarters of a professional football game. In this example, the configuration data can specify that authorization data and/or activation data are required to be received during the first three quarters of the football game in order to activate the node 102. Authorization data and/or activation data that are received outside of this valid period can be considered invalid.

In another example, assume that beverage dispensing for a particular restaurant or bar is only allowed from 12:30 pm-11:00 pm (e.g., the operating hours of the restaurant or bar). In this example, the configuration data that is provided to the node 102 can specify that the valid period for the restaurant or bar is the period of time from 12:30 pm-11:00 pm, such that authorization data and/or activation data must be received by the node 102 during the hours of (or within a specified amount of time of) 12:30 pm-11:00 pm in order for the node 102 to be activated. Thus, the configuration data can operate to restrict beverage dispensing to the hours 12:30 pm-11 pm by considering authorization data and/or activation data that are received outside of the valid period as invalid authorization data and/or invalid activation data.

In some implementations, the valid period can condition only the validity of the activation data, only the validity of authorization data, or separate valid periods can be specified for each of the authorization data and the activation data. For example, the authorization data can have an valid period that starts 3 hours (or another specified amount of time) prior to the start of the football game, while the activation data can have an valid period that is coincident with the duration of the first three quarters of the football game. Specific valid periods are provided for purposes of example, and other valid periods can be specified. Valid periods are discussed in more detail with reference to FIG. 4.

The data store 112 can also store reporting data and/or diagnostic data for the nodes 102. Each node 102 can transmit reporting data and/or diagnostic data to the network management apparatus 110 for storage in the data store 112, or the nodes 102 can transmit the data directly to the data store 112. The data from each node 102 can be transmitted based on a reporting schedule or in response to specified events. For example, a node 102 can be configured to transmit reporting data and/or diagnostic data to the data store 112 (and/or a user device 104) continuously, with a specified frequency (e.g., once every 30 minutes), or after a specified amount of fluid has been dispensed (e.g., 100 ounces). Similarly, the node can transmit reporting data and/or diagnostic data in response to a request for the data. For example, a request for the data can be received from a user device 104 or another data processing apparatus. In response to receiving the request, the node 102 can transmit the data 108 to the user device 104, the network management apparatus 110, and/or the data store 112.

The node 102 can also be configured to transmit reporting data and/or diagnostic data in response to detection of a specified system condition. For example, the node 102 can be configured to transmit reporting and/or diagnostic data in response to determining that the node 102 has less than a threshold amount of free memory, that a temperature of the fluid being dispensed by the node 102 is outside of a specified temperature range, that a pressure of the fluid at the node is outside of a specified acceptable pressure range, that a valve or a flow meter is malfunctioning, that a beverage container (e.g., a keg) is empty or near empty (i.e., contains less than a specified amount of fluid), or that other system conditions exist. When the node 102 transmits data in response to detection of a system condition, the node 102 can also transmit the data and/or an alert message (e.g., to a user device 104) using e-mail, short message service (SMS), or another form of data communication.

Figure 2:
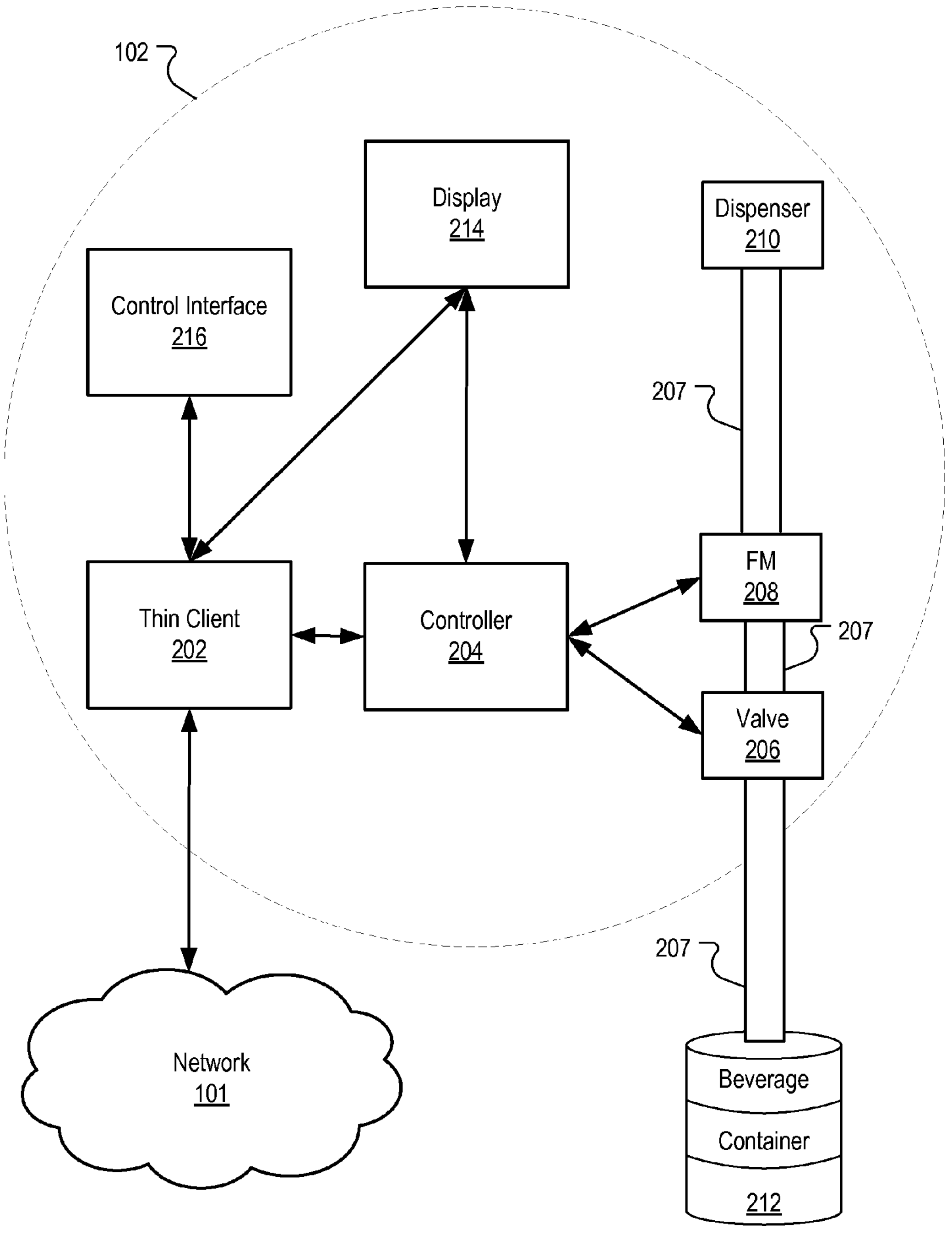
FIG. 2 is a block diagram of an example node that controls beverage dispensing.

FIG. 2 is a block diagram of an example node 102 that controls beverage dispensing. In some implementations, the node 102 includes a thin client 202. The thin client 202 is a data processing apparatus that transmits and receives data over the network 101 and interacts with other elements of the node 102. For example, the thin client 202 can configure a controller 204 using the configuration data that specifies dispensing rules for the node 102, and receive data from the elements of the node 102 (e.g., the controller 204 and the control interface 216). For example, assuming that the configuration data specify that the node 102 is to be activated to dispense beer from 12:30 pm-11 pm, the thin client 202 can interact with the controller 204 to cause the valve 206 to open at 12:30 pm and close at 11 pm.

In some implementations, the controller 204 is a microcontroller that opens the valve 206 by applying a control signal (e.g., a specified current and/or voltage) to the valve 206. The control signal that is applied to the valve 206 to open the valve will depend on the type of valve 206 that is used.

For example, when the valve 206 is a strike and hold valve, the valve 206 will require at least a minimum specified strike current be applied to open the valve 206 from the closed position. Once the strike and hold valve has been opened the control signal that is applied to the valve 206 can be reduced to a value that is greater than a minimum "hold current," where the "hold current" is a current having a lower magnitude than the minimum specified strike current used to open the valve 206.

As long as the control signal is maintained at a current magnitude that is greater than the minimum hold current, the valve will remain open. Once the control signal falls below the minimum hold current, the valve 206 will close. Using a lower current to keep the valve open (i.e., a lower current than that required to open the valve) results in less heat dissipation, which in turn, reduces the possibility that the temperature of the fluid flowing through the valve 206 will increase due to operation of the valve. Thus, the temperature of the fluid passing through the valve 206 can be maintained at a desired serving temperature, such that the taste of the beverage is not affected by heat dissipated by the valve 206. A strike and hold valve is described for purposes of example, but other types of valves can also be used. For example, a toggle valve that opens and closes in response to a rising edge of a toggle signal can be used. Each node 102 can include more than one valve 206. Other solenoid valves can also be used.

The controller 204 can also interact with a flow meter 208 that measures an amount of fluid that is dispensed using a dispenser 210. The dispenser 210 is a device that controls the flow of fluid out of the node 102. For example, the dispenser can be another valve 206, a beer tap, or another device that can be actuated to control the flow of fluid. When the valve 206 and the dispenser 210 are both opened, fluid flows from a beverage container 212 through a beverage line 207, the valve 206, the flow meter 208, and the dispenser. As the fluid flows, the flow meter 208 measures the amount of fluid that is being dispensed by the dispenser 210. In turn, the flow meter 208 continuously or periodically provides flow data to the controller. The flow data are data that represents a measure (e.g., total volume or another measure) of fluid that has passed through the flow meter 208.

Upon receipt of the flow data, the controller 204 can use the flow data to provide reporting data, for example to the thin client 202 (or another data processing apparatus), which in turn, can transmit the reporting data through the network 101 and/or update a display that is coupled to the thin client 202. In some implementations, the controller 204 can also use the reporting data to update a display 214 that is coupled to the controller 204. The display 214 can be, for example, a liquid crystal display (LCD) that displays an amount of fluid (e.g., beer or wine) that has been dispensed by the dispenser 210, a total cost for the dispensed fluid, messages to a user that is using the dispenser, and other information related to the fluid being dispensed (e.g., temperature of the fluid). In some implementations, the display can also present an amount of fluid that a user can dispense, as described below with reference to FIG. 3. The display can be coupled to the thin client 202 and/or the controller 204, depending on the particular implementation. The display can be located, for example, near the dispenser 210 so that a user that opens the dispenser 210 can be presented with the data received by the controller 204.

The display 214 is an optional element of the node 102, and a node 102 can be implemented without a display being coupled to the controller 204 or other elements of the node 102. For example, in implementations where the display 214 is not coupled to the controller 204, reporting data and other information that is presented using the display 214 can be provided to a user device (or another data processing apparatus) that can process the data and/or present the data on a display device that is coupled to the user device.

The node 102 includes a control interface 216 with which activation and/or de-activation of the node 102 is controlled. The control interface 216 is an input/output interface and/or a data processing apparatus that interacts with an identification object (i.e., an object with which one or more items or users are associated) and provides data to the thin client 202 and/or the controller 204 in response to the interaction. The control interface 216 can be an RFID reader/writer that interacts with RFID cards, a magnetic card reader, a smart card reader, a bar code reader, or another type of input/output interface that is configured to interact with other identification objects (e.g., a fingerprint scanner that identifies a user based on their fingerprint). The control interface 216 provides the thin client 202 with data obtained from the interaction with the identification object. When the control interface 216 is implemented as an RFID reader/writer, data obtained in response to detection of an RFID card (e.g., by the RFID card reader/writer) can be provided to the thin client 202.

For example, assume that a concession stand operator at an arena is opening a concession stand. In this example, the operator may place an activate RFID card that is used to activate beer dispensing apparatus at the concession stand next to the control interface 216 to activate the beer dispensing apparatus. Upon detection of the activate RFID card, the control interface can receive a user identifier that is stored on (or otherwise associated with) the card and activation data that is stored on (or otherwise associated with) the card. In turn, the control interface 216 provides the user identifier and the activation data to the thin client 202. In response to receiving the activation data, the thin client 202 can interact with the controller 204 to cause the controller 204 to open the valve 206. As described in more detail below, opening of the valve 206 can be conditioned on the activation data being associated with a user identifier for an enabled user for the node, being received during a valid period, and/or being received following receipt of authorization data. Satisfaction of these conditions can be determined by the thin client 202 (the controller 204, or another network resource), which can include a data storage medium on which parameters of the conditions are stored.

After the beer dispensing apparatus has been activated, the concession stand operator can also de-activate the beer dispensing apparatus using the control interface 216. For example, the concession stand operator can place a de-activate RFID card that is used to de-activate the beer dispensing apparatus next to the control interface 216. Upon detection of the de-activate RFID card, the control interface can receive a user identifier that is stored on (or otherwise associated with) the card and de-activation data that is stored on (or otherwise associated with) the card. In turn, the control interface 216 provides the user identifier and de-activation data to the thin client 202. In response to receiving the de-activation data, the thin client 202 can interact with the controller 204 to cause the controller 204 to close the valve 206.

Figure 3:
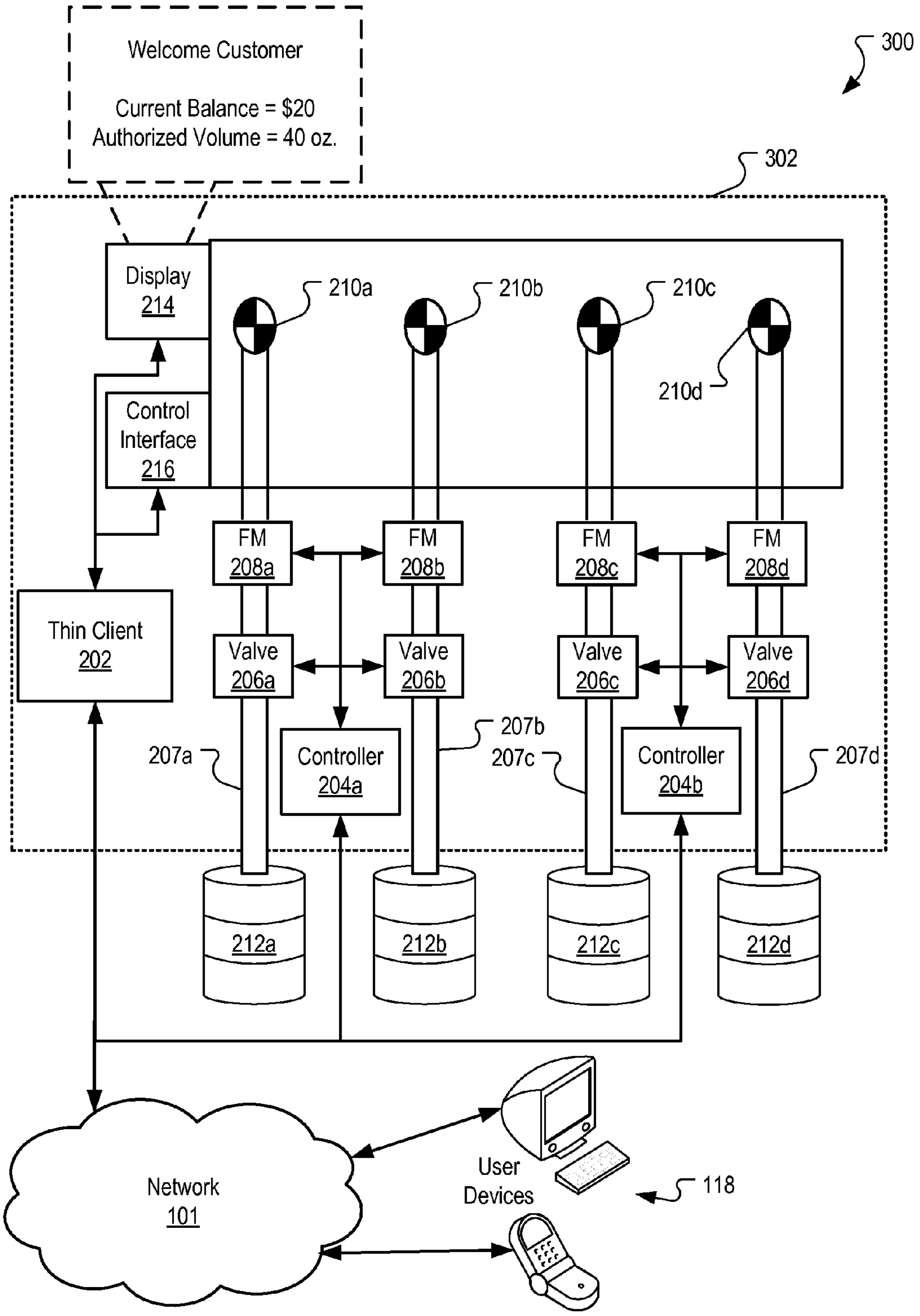
FIG. 3 is a block diagram of an example beverage dispensing system.

FIG. 3 is a block diagram of an example beverage dispensing system 300. The example beverage dispensing system 300 is a beverage dispensing system with which customers can dispense their own beer (or another beverage). While the system 300 is described with reference to self-service beer dispensing, the system 300 can also be used in other environments.

The system 300 is an example of a system that can control and monitor beverage dispensing (e.g., beer dispensing) from multiple different beverage containers 212*a*-212*d* (e.g., kegs). The system 300 includes a node 302 having elements similar to those described above with reference to FIG. 2. The node 302 has a thin client 202 and multiple dispensers 210*a*-210*d*. Each of the dispensers 210*a*-210*d* has a valve 206*a*-206*d* that controls flow of fluid through a line 207*a*-207*d* to the dispenser 210*a*-210*d*. Flow meters 208*a*-208*d* are respectively installed on each of the lines 207*a*-207*d* to measure the flow of fluid that is dispensed using the dispensers 210*a*-210*d*. Two controllers 204*a*, 204*b* control the valves 206*a*-206*d* and received data from flow meters 208*a*-208*d*. One controller 204*a* controls the valves 206*a*, 206*b* and receives data from the flow meters 208*a*, 208*b*, while the other controller 204*b* controls the valves 206*c*, 206*d* and receives data from the flow meters 208*c*, 208*d*. Each controller 204*a*, 204*b* can be implemented to control more or fewer valves 206 and receive data from fewer or more flow meters 208.

The node 302 includes a control interface 216 and a display 214. As described above, the control interface can be an RFID reader that detects RFID cards that are placed near the interface 216. For example, the control interface 216 can be placed at a location that is accessible by customers of a bar, restaurant, or another business. In this example, the customer can obtain an RFID card from an employee of the business after providing proof that the customer is at least the minimum legal drinking age. The RFID card can include memory that stores data that uniquely identify the customer (i.e., user identifier data). The RFID card can also store data representing an amount of money that the customer has pre-paid for beer.

When the customer is ready to dispense beer, the customer can place the RFID card near the control interface 216. In response to detecting the RFID card and receiving activation data from the RFID card, the control interface 216 can provide the activation data received from the RFID card to the thin client 202. In turn, the thin client 202 can provide data to the display 214 that causes, for example, presentation of a welcome message and/or information about the customer's ability to dispense beer. For example, the data provided to the display 214 can cause presentation of an amount of money remaining in the customer's account and/or an amount of beer that the customer is allowed to dispense.

The amount of beer that the customer is allowed to dispense can be based on a check limit. The check limit is a volume of beer that a customer can dispense before the customer is required to request approval to dispense more beer (e.g., by speaking with a designated employee of the restaurant or bar). For example, prior to the customer dispensing any beer, the amount of beer that the customer is allowed to dispense can be equal to the check limit. Each time the customer dispenses beer, the amount of beer that the customer is allowed to dispense is decreased by the amount of beer dispensed by the customer.

The thin client 202 (or the controller) can use the activation data received from the control interface 216 to determine whether to open the valves **206*a* based on whether the user associated with the user identifier is allowed to dispense beer. For example, the thin client 202** can determine that the user is allowed to dispense beer when the amount of beer dispensed by the user is less than the check limit and the user still has a positive account balance.

The thin client 202 (or the controller 204) can also determine whether authorization data has been received and/or whether the activation data received from the control interface 216 was received during a valid period. For example, the thin client 202 can determine whether an owner, operator, or another authorized employee has authorized the node 302 to be activated. In some implementations, the thin client 202 can also determine whether the time at which the activation data was received from the control interface 216 is during a valid period (e.g., during business hours and/or before last call). In response to determining that the user is allowed to dispense beer, and optionally whether authorization data has been received and whether the activation data was received during a valid period, the thin client 202 can interact with the controllers **204*a*, 204*b* to open the valves 206*a*-206*d***.

If the thin client 202 (or the controller 204) determines that the customer has reached the check limit (and not been reauthorized to dispense beer) or has an account balance of $0 (or an amount less than the cost of a full glass of beer), the thin client 202 can prevent the valves **206*a*-206*d* from being opened (e.g., by not interacting with the controllers 204*a*, 204*b*), and/or provide data to the display 214** (and/or a user device accessible by an employee of the business) specifying that the customer is not allowed to dispense beer and the reason(s) why.

Once the valves **206*a*-206*d* are open, the flow meters 208*a*-208*d*** monitor the flow of beer and provide flow data back to the controller specifying an amount of beer that was dispensed by the customer. The flow data can be used to decrease the volume of beer that the customer is allowed to dispense and reduce the money available in the customer's account.

When it has been determined that the customer has finished dispensing beer, the valves **206*a*-206*d* are closed. In some implementations, the controllers 204*a*, 204*b* and/or the thin client 202 can determine that the customer has finished dispensing beer when no beer has been dispensed for at least a specified time. For example, if more than 2 seconds (or another specified time) has passes since the customer dispensed beer, the controllers 204*a*, 204*b* can cause the valves 206*a*-206*d* to close. The amount of time that has passed since the customer dispensed beer can be determined, for example, based on an amount of time since the controllers 204*a*, 204*b*** have received data from the flow meter indicating that beer has been dispensed.

The valves **206*a*-206*d* can also be closed in response to other conditions. For example, each of the valves 206*a*-206*d* can be selectively closed in response to a determination that the beverage container 212*a*-212*d* from which the beer is drawn is empty. Additionally, each of the valves 206*a*-206*d* can be selectively closed in response to determining that the temperature of the beer is outside of an acceptable range. Further, each of the valves 206*a*-206*d* can be closed in response to detection of a node 102** malfunction that inhibits the control and monitoring of beer dispensing.

As described above, the thin client 202 (or controller 204) can provide reporting data and/or diagnostic data to user devices, a network management apparatus, and/or data stores that are coupled to the network 101. Thus, beer dispensed by many different nodes 102 can be controlled and monitored from a central location, even when the nodes are installed at locations that are geographically far apart.

In addition to implementing systems that control and monitor self-service beer dispensing, nodes similar to those described above can also be used to implement a system that enables control and monitoring of beer that is dispensed by employees of a business or event location. In some implementations, nodes similar to those described above can be implemented in a system that controls and monitors beer that is dispensed at an event venue, such as a sports stadium or a concert venue, as described below.

Figure 4:
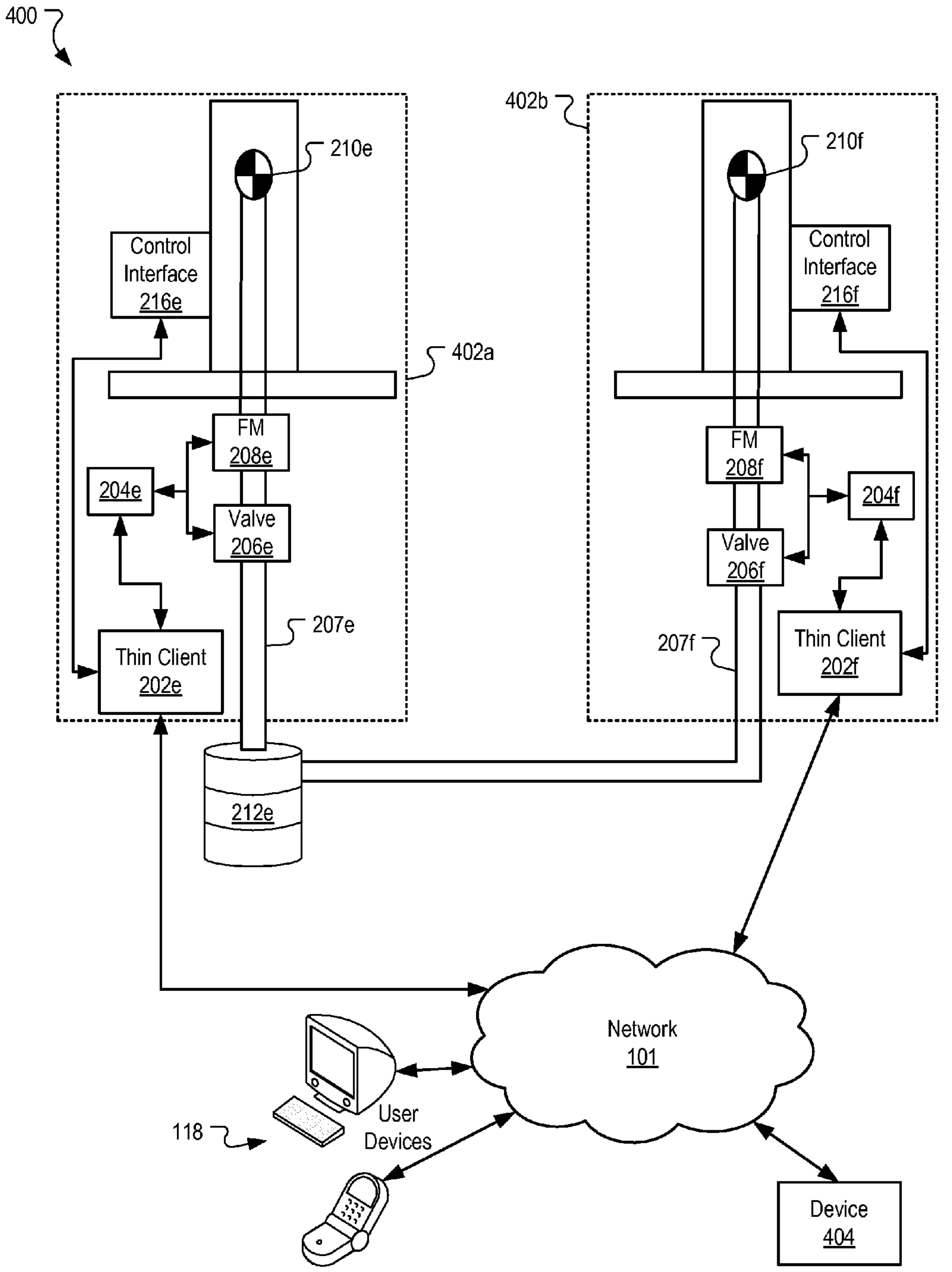
FIG. 4 is a block diagram of another example beverage dispensing system.

FIG. 4 is a block diagram of another example beverage dispensing system 400. The system 400 is a system with which beer that is dispensed by employees of a business or venue can be controlled and monitored. While the system 400 is described with reference to dispensing beer at sports venues, the system 400 can also be used in other environments (e.g., other event venues, bars, restaurants, and other environments in which beverages are dispensed).

The system 400 is an example of a system that can control and monitor dispensing of beer from multiple dispensers **210*e*, 210*f* that are each connected to a same beverage container 212*e* (e.g., a same keg). Each of the dispensers 210*e*, 210*f* can also be connected to different beverage containers. The system 400 includes two nodes 402*a*, 402*b* with which beer dispensing is controlled and monitored. Each of the nodes 402*a*, 402*b* includes a thin client 202*e*, 202*f*, a control interface 216*e*, 216*f*, a valve 206*e*, 206*f*, and a flow meter 208*e*, 208*f* that tracks flow of fluid through a line 207*e*, 207*f***.

The node **402*a* can be located, for example, at one concession stand in a sports stadium, while the node 402*b* can be located at another concession stand in the stadium. The thin clients 202*e*, 202*f*, can receive, over the network 101, configuration data that specifies dispensing rules for the stadium and/or the particular concession stand. The configuration data for the stadium can include for example, data specifying valid periods during which beer is allowed to be dispensed. In some implementations, the valid periods are periods during which events are being held at the stadium. In these implementations, the configuration data received by the thin clients 202*e*, 202*f*** can specify a schedule of events.

The schedule of events can include, for each event, a start time and a stop time. The start time represents a start of the valid period for the event (i.e., the period during which beer is allowed to be dispensed). The start time can be, for example, the start time of the event, or a specified amount of time prior to (or after) the start of the event. While the start time specifies a period during which beer is allowed to be dispensed, the activation of the nodes 402*a*, 402*b* can be conditioned on receiving authorization data and/or activation data. For example, the configuration data for the nodes 402*a*, 402*b* can specify that the nodes 402*a*, 402*b* are only activated when activation data has been received during the valid period and following receipt of authorization data. The configuration data can also specify, for example, that the authorization data and activation data both be received during the valid period.

The stop time represents an end of the valid period for the event. When the stop time has occurred, the valves 206*e*, 206*f* are closed, such that beer can no longer be dispensed from the nodes 402*a*, 402*b*. The stop time can be, for example, the time at which the event is scheduled to end, a time prior to (or after) the time at which the event is scheduled to end, or a time at which a specified event occurs. For example, the stop time during a football game can be the time at which the third quarter ends (i.e., the time at which the time remaining in the third quarter reaches 0:00). To facilitate an event based stop time, the thin clients 202*e*, 202*f* can interact with a device 404 that provides data specifying that the specified event has occurred. In the example above, the device 404 can be the scoreboard, or a data processing apparatus coupled to the scoreboard. At the expiration of the third quarter the thin clients 202*e*, 202*f* (or controllers 204*e*, 204*f*) receive data from the device 404 specifying that the game has reached the end of the third quarter, and the time at which the data are received can be set as the stop time for the event. In turn, the thin clients 202*e*, 202*f* can interact with the controllers 208*e*, 208*f* to actuate the valves 206*e*, 206*f* to the closed position.

The valid periods described above can be used as part of a multi-tiered activation scheme. A multi-tiered activation scheme specifies a set of data that must be received in order for a node to be activated. For example, a multi-tiered activation scheme can specify that a node only be activated when activation data has been received following receipt of authorization data. Another multi-tiered activation scheme may specify that a node be activated in response to receipt of activation data during a valid period. In this multi-tiered activation scheme authorization data is not required to be separately provided, as the beginning of the valid period is sufficient to authorize the node for activation. For example, the valid period may be scheduled by an authorized user (i.e., a user that is has been enabled to authorize and/or activate one or more nodes), such that scheduling the valid period may operate as authorization data that becomes valid at the start of the valid period. Still another multi-tiered activation scheme may specify that a node be activated in response to receipt of authorization data and receipt of activation data during a valid period.

Multi-tiered activation schemes facilitate increased control and oversight of beer dispensing at a stadium (or another facility). For example, if a group of managers, or another group of authorized users, are the only users that are authorized to provide authorization data, then the nodes 402*a*, 402*b* can only be activated when this group of specified users has provided the authorization data. Similarly, if a group of enabled users (i.e., users that are enabled to activate one or more nodes) are the only users that are enabled to provide activation data for the nodes, then the nodes 402*a*, 402*b* can only be activated when this group of enabled users has provided the activation data. The authorization data and/or activation data can be received in response to detection of an RFID card for an authorized user and/or an enabled user, or when the authorized and/or enabled user interacts with user interface elements of a password protected user interface through which a user can provide the authorization and/or activation data.

In some implementations, multi-tiered activation schemes specify that the receipt of authorization data are a condition precedent to any activation of any node. Therefore, nodes that are controlled under these schemes will not be activated when the nodes have not received authorization data, irrespective of whether activation data has been received from an authorized user and/or whether it is a valid period. Thus, in these multi-tiered activation schemes beer is only dispensed by a node when the node has been authorized (e.g., by an authorized user) and activated. In these implementations, the authorization data can be used to authorize a large group of nodes, while activation data can be used to activate one or more of the authorized nodes.

For example, assume that the multi-tiered activation scheme requires a node to receive activation data during a valid period and following receipt of authorization data in order for the node to be activated. In this example, an authorized user may authorize all nodes in a stadium by causing, during a valid period, global authorization data to be provided to each of the nodes in the stadium. In response to receiving the global authorization data and determining that the current time is during a valid period, each of the nodes will be authorized to dispense beer. However, in this example, a node will not be activated until it also receives activation data.

Continuing with this example, assume that each of the concession stand operators is provided an RFID card that activates a particular node in the stadium. In this example, each particular node will only be activated when the RFID card that activates a particular node is placed near the control interface for the particular node. Thus, even though the nodes are globally authorized, the valves 206*e*, 206*f* will not be opened and beer will not be dispensed by any particular node until activation data are also received by that node.

Once a particular node has been activated, that particular node can be used to dispense beer until valves 206*e*, 206*f* are closed. In some implementations, the valves 206*e*, 206*f* are closed in response to receiving de-authorization data or de-activation data. De-authorization data are data specifying that beverage dispensing is no longer authorized. In response to receiving de-authorization data, the valves 206*e*, 206*f* are closed irrespective of whether de-activation data has been received and irrespective of whether the valid period has ended. Thus, receipt of de-authorization data alone can cause the valves 206*e*, 206*f* to be closed unconditionally. De-authorization data can be received by a node in a manner similar to the manner by which authorization data are received. For example, an RFID card or another identification object that is associated with de-authorization data can be detected by a control interface 216*e*, 216*f*, or a remotely located control interface (e.g., in a secure room of the venue).

In some implementations, a user can access a password protected user interface that enables the user to interact with one or more user interface elements to de-authorize the nodes 402*a*, 402*b*. The user can also use a mobile application on a mobile communications device (e.g., a cell phone or personal data assistant) to cause de-authorization data to be provided to the nodes 402*e*, 402*f*. For example, the user can launch a node control application on a cell phone, and select a de-authorize button element. In response to selection of the de-authorize button element, data can be transmitted over a data network to the nodes 402*e*, 402*f*. Once de-authorization data has been received by the nodes 402*e*, 402*f*, the nodes 402*e*, 402*f* will remain de-authorized, and therefore, de-activated until new instances of authorization data and/or activation data are received.

The valves 206*e*, 206*f* can also be closed in response to receiving de-activation data. De-activation data are data specifying that a node is no longer activated for dispensing beverages, although the node may still be authorized to dispense beverages. In response to receiving de-activation data, the valves 206*e*, 206*f* are closed. De-activation data can be received in a manner similar to the manner by which activation data are received. For example, an RFID card or another identification object that is associated with de-activation data can be detected by a control interface 216*e*, 216*f* of a node being de-activated. The de-activation data can also be provided to the nodes in response to user interaction with a password protected user interface that causes de-activation data to be provided to one or more nodes (e.g., using a mobile communications device or a remote computer).

When de-activation data are received by a node that is still authorized to dispense beverages (e.g., during a valid period and the node has not received de-authorization data) the node can be re-activated in response to receiving a new instance of activation data. Therefore, a concession stand operator or another user that has authority to activate/de-activate a node can selectably control activation of the node when the node is otherwise authorized to dispense beverages. For example, assume that a stadium concession stand operator, who has the authority to activate/de-activate a node, must leave his/her stand for a short period of time. In this example, the operator can de-activate the node during his/her absence (e.g., by placing a de-activate RFID card near the control interface), and then re-activate the node upon his/her return to the stand (e.g., by placing an activate RFID card near the control interface).

In addition to enabling global and/or selective activation of nodes, a multi-tiered activation scheme can also provide increased accountability related to beer dispensing. For example, the reporting data and/or diagnostic data that are generated by a particular node can include user identifiers specifying one or more users that authorized and/or activated the node. Thus, the amount of beer dispensed, amount of money collected, and other data can be computed and tracked for each authorized and/or enabled user. This data can be compiled into a report that identifies users and measures of sales and/or realization rates (i.e., money collected/total price of beer dispensed) that are associated with the users.

Figure 5:
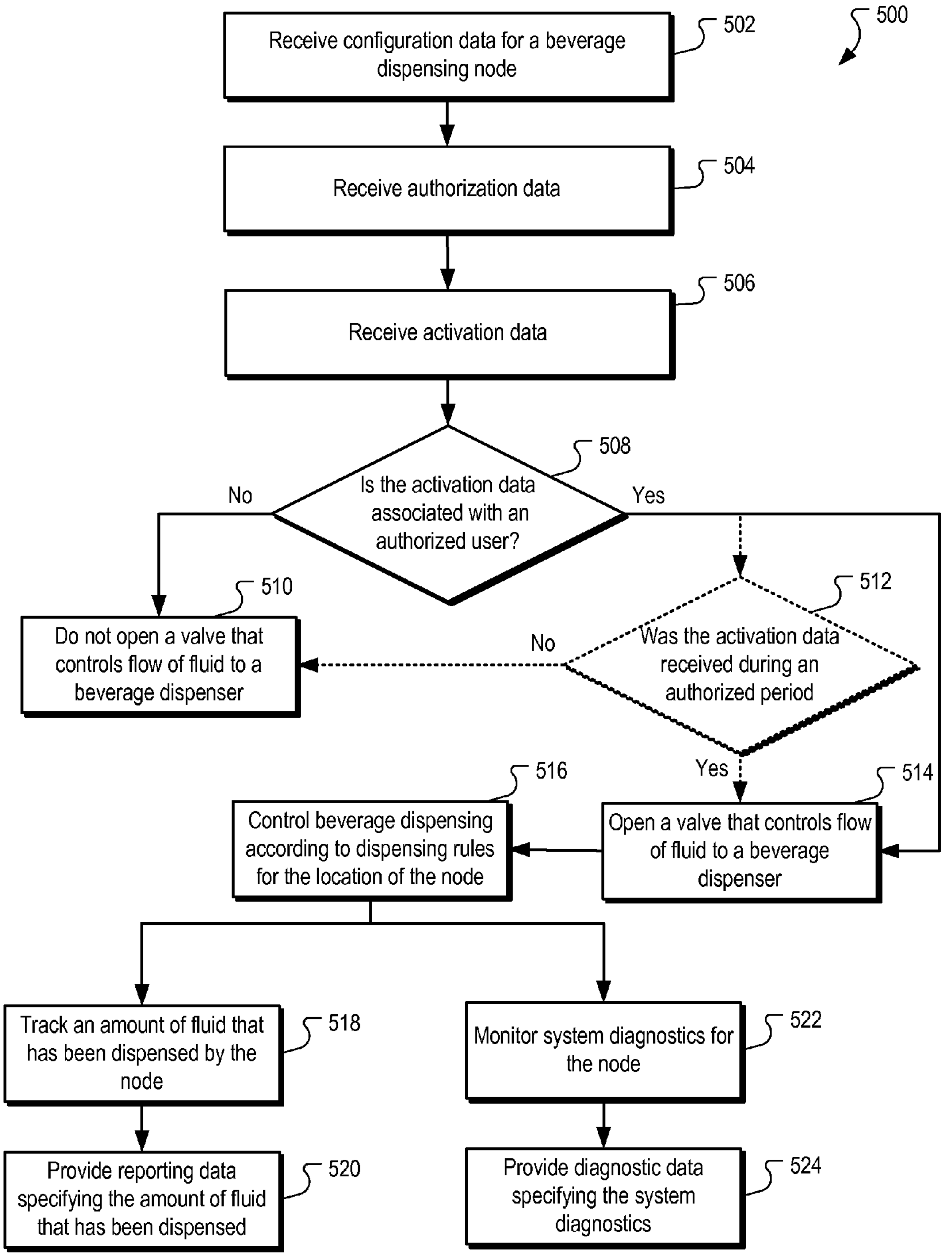
FIG. 5 is a flow chart of an example process for controlling beverage dispensing.

FIG. 5 is a flow chart of an example process 500 for controlling beverage dispensing. The process 500 is a process by which configuration data, authorization data, and activation data are received. A determination is made whether the activation data are associated with a user identifier for an enabled user and whether the activation data was received during a valid period. If it is determined that the activation data are not associated with a user identifier for an enabled user or that the activation data was not received during an activation period, a valve of the node is not opened. If the activation data are associated with a user identifier for an enabled user and was received during a valid period, the valve is opened. When the valve is open, beverage dispensing is controlled according to dispensing rules for the location of the node, as specified by the configuration data. The amount of fluid that has been dispensed is tracked and system diagnostics are monitored. Reporting data specifying the amount of fluid dispensed and diagnostic data specifying the monitored system diagnostics are provided. In some implementations, a subset of the steps described below are performed. In other implementations, additional steps can be performed.

The process 500 can be implemented, for example, by the node 102 and/or the network management apparatus 110 of FIG. 1. In some implementations, the network management apparatus 110 is a data processing apparatus that includes one or more processors that are configured to perform actions of the process 500. In other implementations, a computer readable medium can include instructions that when executed by a computer cause the computer to perform actions of the process 500. The process 500 is described below with reference to controlling beer dispensing. The process 500 can also be used to control dispensing of other fluids.

Configuration data for a beverage dispensing node is received (502). The beverage dispensing node can be a beer dispensing apparatus that is implemented to control the dispensing of beer. The beverage dispensing node can be implemented, for example, as described with reference to FIGS. 1-4. The configuration data can be received, for example, from the network management apparatus 110 and/or the data store 112 of FIG. 1.

The configuration data specify dispensing rules for a location at which the node is located. In some implementations, the dispensing rules specify times at which beer can be dispensed, user identifiers for users for authorized/enabled users, and/or conditions that must be satisfied for the node to be activated. The configuration data, including the dispensing rules, can vary based on the environment in which the node is installed.

The configuration data for a node that enables a restaurant or bar customer to dispense their own beer, as described with reference to FIG. 3, may specify conditions under which the customers are allowed to dispense beer. If these conditions are not satisfied, the valve of the node can be closed or remain closed. For example, the configuration data can specify a check limit for each customer and condition dispensing of beer by the customer on the check limit having not been reached and/or on the check limit having been reset by a venue representative (e.g., a server). In this example, if a customer has reached the check limit, the valves of the node can be closed to this customer until the check limit is reset for the user (e.g., by visiting a server or a specified amount of time (e.g., 24 hours) passing.

The configuration data for the node may also specify a pour rate limit for each customer. The pour rate limit is a maximum volume of beer that each customer can dispense within a specified time (e.g., a maximum of 20 oz. of beer within a 15 minute span). The configuration data for this node may also require that customers pre-pay for beer prior to being enabled to dispense beer, as described in more detail with reference to FIG. 3.

In some implementations, the configuration data specify that a node be de-activated when beer has not been dispensed for at least a minimum specified time. For example, the configuration data may specify that the node be de-activated when beer has not been dispensed for at least 2 seconds. In this example, two seconds after a user stops dispensing beer, the node will be de-activated, such that the user or another enabled user must provide the node with a new instance of activation data to re-activate the node. Automatically de-activating the node when beer has not been dispensed for at least the specified time prevents other users from dispensing beer without providing new activation data, while also preventing the node from being de-activated in response to a user ceasing dispensing only momentarily (e.g., 1 second).

The configuration data for a node that is controlled by an employee of a venue (e.g., a sports venue) can include, for example, data specifying valid periods for the node, a multi-tier activation scheme for the node, among other configuration parameters. For example, the configuration data for this node can specify that the node can only be activated when activation data that is associated with a specific user identifier for an enabled user is received during a valid period, and after receipt of authorization data.

The configuration data for each node can also specify a reporting schedule that specifies a frequency with which the node is to provide reporting data. For example, the configuration data for a node that is implemented in an event venue may specify that the node is to provide reporting data a specified number of times during each event and/or at the stop time for each event. The configuration data for a node that is implemented in a bar or restaurant may specify that the node is to provide reporting data every hour and/or each time that the node is de-activated. For example, in the self-serve dispensing configuration of FIG. 3, the configuration data can specify that reporting data are provided each time that the node is de-activated (e.g., following use by a user).

Authorization data are received (504). The authorization data specify that a beverage dispensing node is authorized to dispense beverages. The authorization data can be received, for example, in response to detection of an RFID card or another identification object that is associated with authorization data. The authorization data can also be received in response to user interaction with a user interface through which authorization of the node can be requested. For example, the user can access a password protected account that includes an "authorize nodes" user interface element. In response to user selection of the "authorize nodes" user interface element, authorization data can be provided to one or more nodes.

The nodes to which the authorization data are provided can include all nodes that the user is authorized to authorize or a subset of those nodes. For example, assuming that a user is authorized to authorize nodes in two or more locations, the user can authorize all or a subset of nodes at one location by selecting node identifiers for the nodes and then selecting the "authorize nodes" user interface element. Alternatively, the user can authorize a subset of nodes from each location such that at least one node from each location remains unauthorized.

In some implementations, authorization of a node causes the node to be eligible for activation, but does not activate the node. For example, when a multi-tiered activation scheme is used to control activation of nodes, authorization of a node can be a condition precedent to activation of the node, but activation of the node can require receipt of activation data following receipt of the authorization data. In these implementations, the validity of the activation data and/or the authorization data can be conditioned based on a valid period. For example, the validity of the authorization and/or activation data can be conditioned on receipt of the authorization and/or activation data during a valid period. Alternatively, authorization and/or activation data that are received prior to a valid period can become valid at a start time of the valid period.

In some implementations, authorization data are received with the configuration data for the node. In these implementations, the node is authorized by default (or during valid periods) without requiring receipt of the authorization data from an authorized user (e.g., in response to the user placing an RFID card near a control interface). In these implementations, activation of the node can occur in response to receipt of activation data, the validity of which can be selectively conditioned based on a valid period, as described above.

Activation data are received (506). In some implementations, the activation data requests activation of the node, where activation of a node causes a valve that controls flow of fluid through a beverage dispenser to be opened. In some implementations, the valve can be implemented in the beverage dispenser. The activation data can be received, for example, in response to detection of an RFID card or another identification object that is associated with activation data. When the activation data are received using an RFID card, each node can be activated individually by placing the RFID card that is associated with the activation data near the control interface for the node being activated.

The activation data can also be received in response to user interaction with a user interface through which activation of the node can be requested. For example, the user can access a password protected account that includes an "activate nodes" user interface element. In response to user selection of the "activate nodes" user interface element, activation data can be provided to one or more nodes (e.g., over the Internet or another distributed computing environment).

The nodes to which the activation data are provided can include all nodes that the user is enabled to activate or a subset of those nodes. For example, assuming that a user is enabled to activate two or more nodes, the user can activate all or a subset of nodes by selecting node identifiers for the nodes and then selecting the "activate nodes" user interface element. Alternatively, the user can authorize a subset of nodes such that at least one node remains de-activated.

A determination is made whether the activation data are associated with an enabled user (508). In some implementations, the enabled user is a user that has been enabled to activate the node. The determination can be made, for example, by obtaining a user identifier associated with the activation data and determining whether the user identifier is included in a set of user identifiers representing enabled users. The user identifier that is associated with the activation data can be included, for example, with the activation data and the set of user identifiers representing enabled users can be stored and/or indexed in a data store.

For example, a unique alpha-numeric identifier representing a user to whom an RFID card has been issued can be stored in the memory of the RFID card and/or an index of RFID cards. When the RFID card is detected, the alpha-numeric identifier can be read from the memory of the RFID card. In turn, the alpha-numeric identifier can be compared to a set of alpha-numeric identifiers for enabled users, and the user can be determined to be an enabled user when a match is detected. Otherwise, the user is determined to be a non-enabled user. When the user from which the activation data are received is determined to be a non-enabled user, a valve that controls the flow of fluid to a beverage dispenser from the node is not opened (510).

When the user from which the activation data are received is determined to be an enabled user, it is optionally determined whether the activation data was received during a valid period (512), or a valve that controls flow of fluid to a beverage dispenser is opened (514), as described below. As described above, the valid period is a period during which activation data are considered valid. The determination that the activation data was received during a valid period can be made, for example, by comparing a time at which the activation data was received to a schedule of one or more valid periods for the node.

In some implementations, the one or more valid periods are received as an event schedule for an event venue, where each event in the event schedule has a start time that represents a start of the valid period for the event and a stop time that represents an end of the valid period for the event. As described above, the stop time for the event can be a time prior to the end of the event or a time after the end of the event. The stop time can also be a time at which a specified event occurs (e.g., the end of the third quarter of a football game). When the stop time is a time at which a specified event occurs, stop time data specifying a time at which the specified event occurred can be received, and in response to receipt of the stop time data, the valid period can be ended.

When it is determined that the activation data was not received during a valid period, a valve that controls flow of the fluid to a beverage dispenser is not opened (510). When it is determined that the activation data was received during a valid period, a valve that controls flow of fluid to a beverage dispenser is opened (514). In some implementations, the valve is an electronic control valve that is opened in response to a control signal. For example, the electronic control valve can be opened by applying at least a strike current to a strike and hold valve for a first period to open the valve and then applying a hold current following the strike current to keep the valve open.

Once the valve has been opened, beverage dispensing is controlled according to dispensing rules for the location of the node (516). In some implementations, the dispensing rules are included in the configuration data that is received. In other implementations, the dispensing rules can be separately specified and/or modified using a user device that is configured to communicate with the node.

In some implementations, beverage dispensing is controlled by closing the valve that controls the flow of fluid to the beverage dispenser in response to a per-person dispensing limit being met. For example, when the node is implemented to enable self-service beer dispensing, the valve of the node can be closed in response to determining that a particular user has reached a check-limit, as described above.

An amount of fluid (e.g., beer) that has been dispensed is tracked (518). The amount of fluid that has been dispensed can be measured, for example, by a flow meter and flow data can be provided to one or more data processing apparatus, such as the thin client 202 of FIG. 2. Reporting data specifying the amount of fluid that has been dispensed is provided (520). In some implementations, the reporting data are provided to a data processing apparatus that processes the reporting data and presents the reporting data on a display device. The reporting data can specify for example, a total amount of fluid dispensed, dispensing trends, and an amount of revenue received for the fluid dispensed, and other report measures. In some implementations, the reporting data are provided to a user device, such as a mobile communications device or a personal computer. In other implementations, the reporting data are provided to a data store that can be accessed by one or more user devices.

System diagnostics for the node are monitored (522). Diagnostic data can be acquired by monitoring the system diagnostics for the node. For example, the monitored diagnostic data can include a measure of available memory, a valve status (e.g., operating normally or malfunctioning), a beverage temperature, a beverage dispenser status (e.g., open or closed), a fluid pressure, and a beverage container status (e.g., empty keg).

Diagnostic data specifying the system diagnostics are provided (524). In some implementations, the diagnostic data are provided to a data processing apparatus that processes the diagnostic data and presents the monitored system diagnostics on a display device. In some implementations, the diagnostic data are provided to a user device, such as a mobile communications device or a personal computer. In other implementations, the diagnostic data are provided to a data store that can be accessed by one or more user devices. The diagnostic data can be provided, for example, by e-mail, SMS, or another communication format.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data to a client device. Data generated at the client device can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:

obtaining, by a data processing apparatus and from a data store, configuration data specifying a multi-tier activation scheme that must be met for a beverage dispensing node to be enabled to dispense beverages, the multi-tier activation scheme specifying that activation data requesting activation of the beverage dispensing node by a first entity authorized to activate the node will enable the beverage dispensing node only when received subsequent to receipt of authorization data from a second entity;

receiving, by a data processing apparatus and from an enabled user, activation data that requests activation of the node from the first entity, wherein the activation of the beverage dispensing node causes a valve located between a beverage source and a beverage dispenser to be opened independent of a request to dispense a beverage at the beverage dispenser, wherein the beverage dispenser is a device that controls dispensing of a beverage when the valve is open;

determining, by a data processing apparatus, whether authorization data was received from the second entity prior to receiving the activation data from the first entity;

selecting, by a data processing apparatus, an activation state for the beverage dispensing node based on the determination and the obtained configuration data, an activation state of activated being selected in response to determining that the authorization data was received prior to the activation data, and an activation state of de-activated being selected in response to determining that the authorization data was not received prior to the activation data, wherein the de-activated state corresponds to the valve being closed; and opening the valve located between the beverage source and the beverage dispenser when the activated state is selected.

2. The method of claim 1, further comprising:

receiving data requesting deactivation of the beverage dispensing node;

determining that the received data are associated with a user identifier for an enabled user, the enabled user being a user that has been enabled to de-activate the beverage dispensing apparatus; and in response to receipt of the data, closing the valve located between the beverage source and the beverage dispenser.

3. The method of claim 2, wherein:

receiving data comprises receiving de-authorization data from the second entity specifying that the beverage dispensing apparatus is no longer authorized to be activated; and the second entity is a manager or supervisor of the first entity.

4. The method of claim 2, wherein receiving data comprises receiving de-activation data specifying that the beverage dispensing apparatus is disabled for beverage dispensing.

5. The method of claim 1, wherein opening a valve comprises opening an electronic control valve that controls flow of fluid between the beverage source and the beverage dispenser, the method further comprising:

dispensing a beverage when the beverage dispenser is in an open state; and preventing beverage dispensing when the beverage dispenser is in a closed state.

6. The method of claim 5, wherein opening the electronic control valve comprises actuating a strike and hold valve that opens in response to a minimum specified current and remains open as long as a second current is maintained, the second current being less than the minimum specified current.

7. The method of claim 1, further comprising:

determining that the activation data has been received during a valid period, the valid period being a period during which activation data are considered valid, wherein opening a valve comprises actuating the valve in response to:

receipt of the authorization data, the determination that the activation data are associated with a user identifier for a user, and the determination that the activation data has been received during the valid period.

8. The method of claim 7, wherein determining that the activation data has been received during a valid period comprises:

receiving a schedule of one or more valid periods; and determining that a time at which the activation data was received was during a valid period according to the schedule of one or more valid periods.

9. The method of claim 8, wherein receiving a schedule of one or more valid periods comprises receiving an event schedule for an event venue, each event in the event schedule having a start time representing a start of the valid period for the event and a stop time representing an end of the valid period for the event.

10. The method of claim 9, wherein the stop time for the event is a time prior to the end of the event.

11. The method of claim 10, wherein the stop time is a time at which a specified event occurs.

12. The method of claim 1, further comprising:

receiving game data specifying that a game has reached a specified point at which beverage dispensing is restricted, the received game data being independent of a time of day clock; and de-activating the beverage dispensing node based on the receipt of the game data.

13. The method of claim 12, wherein receiving game data comprises receiving, from a game clock that functions independent of a time of day clock, data indicating that a specified portion of the game has been played.

14. The method of claim 13, wherein:

receiving data indicating that a specified portion of the game has been played comprises receiving data specifying that a specified portion of a football game has been played; and de-activating the beverage dispensing node comprises de-activating beer vending stations in a venue of the football game.

15. The method of claim 1, further comprising:

tracking an amount of fluid that has been dispensed by the beverage dispenser; and providing reporting data specifying the amount of fluid that has been dispensed by the beverage dispenser.

16. The method of claim 15, wherein providing reporting data comprises providing the reporting data according to a reporting schedule, in response to a request for the reporting data, or in response to a change in the amount of fluid dispensed.

17. The method of claim 1, further comprising:

monitoring system diagnostics for a system in which the beverage dispensing node is installed; and providing diagnostic data specifying the system diagnostics.

18. The method of claim 17, wherein providing diagnostic data comprises providing data specifying at least one of a flow meter operating condition, a measure of available memory, a valve status, a beverage temperature, a beverage dispenser status, a fluid pressure, and a beverage container status.

19. The method of claim 17, wherein providing the diagnostic data comprises providing the diagnostic data by at least one of e-mail and text message.

20. The method of claim 1, comprising receiving the authorization data from a user device that is registered on a different local area network than the data processing apparatus.

21. The method of claim 1, comprising receiving the authorization data from a mobile device communicating over a mobile communications network.

22. A system comprising:

a data storage device that stores configuration data specifying a multi-tier activation scheme that must be met for a beverage dispensing node to be enabled to dispense beverages, the multi-tier activation scheme specifying that activation data requesting activation of the beverage dispensing node by a first entity authorized to activate the node will enable the beverage dispensing node only when received subsequent to receipt of authorization data from a second entity; and a beverage dispensing apparatus configured to interact with the data storage device and perform operations comprising:

obtaining the configuration data from the data storage device;

receiving activation data that requests activation of the node, wherein activation of the node from the first entity, wherein the activation of the beverage dispensing node causes a valve located between a beverage source and a beverage dispenser to be opened independent of a request to dispense a beverage at the beverage dispenser, wherein the beverage dispenser is a device that controls dispensing of a beverage when the valve is open;

determining whether authorization data was received from the second entity prior to receiving the activation data from the first entity;

selecting an activation state for the beverage dispensing node based on the determination and the obtained configuration data, an activation state of activated being selected in response to determining that the authorization data was received prior to the activation data, and an activation state of de-activated being selected in response to determining that the authorization data was not received prior to the activation data, wherein the de-activated state corresponds to the valve being closed; and opening the valve located between the beverage source and the beverage dispenser when the activated state is selected.

23. The system of claim 22, wherein the beverage dispensing apparatus include an electronic control valve that is opened in response to receipt of the authorization data and the activation data.

24. The system of claim 23, wherein the electronic control valve is a strike and hold valve that opens in response to a strike current and remains open as long as a hold current is maintained, the hold current having a lower magnitude than the strike current.

25. The system of claim 22, wherein the beverage dispensing apparatus includes a flow meter that measures a flow of fluid to the beverage dispenser.

26. The system of claim 22, wherein the beverage dispensing apparatus includes a thin client that interacts with one or more data processing devices over a distributed network.

27. The system of claim 22, wherein the beverage dispensing apparatus includes a controller that generates one or more control signals with which the valve that controls flow of fluid to the beverage dispenser is controlled.

28. The system of claim 22, wherein the beverage dispensing apparatus includes a control interface with which the activation data are received.

29. The system of claim 28, wherein the control interface is an RFID interface that detects an RFID card on which activation data are stored.

30. A non-transitory computer storage medium encoded with a computer program, the program comprising instructions that when executed by data processing apparatus cause the data processing apparatus to perform operations comprising:

obtaining configuration data specifying a multi-tier activation scheme that must be met for a beverage dispensing node to be enabled to dispense beverages, the multi-tier activation scheme specifying that activation data requesting activation of the beverage dispensing node by a first entity authorized to activate the node will enable the beverage dispensing node only when received subsequent to receipt of authorization data from a second entity;

receiving activation data that requests activation of the node from the first entity, wherein the activation of the beverage dispensing node causes a valve located between a beverage source and a beverage dispenser to be opened independent of a request to dispense a beverage at the beverage dispenser, wherein the beverage dispenser is a device that controls dispensing of a beverage when the valve is open;

determining whether authorization data was received from the second entity prior to receiving the activation data from the first entity;

selecting an activation state for the beverage dispensing node based on the determination and the obtained configuration data, an activation state of activated being selected in response to determining that the authorization data was received prior to the activation data, and an activation state of de-activated being selected in response to determining that the authorization data was not received prior to the activation data, wherein the de-activated state corresponds to the valve being closed; and opening the valve located between the beverage source and the beverage dispenser when the activated state is selected.

31. A method comprising:

receiving, by one or more data processing apparatus, game data specifying that a game has reached a specified point at which beverage dispensing is restricted, the received game data being independent of a time of day clock; and de-activating a plurality of beverage dispensing nodes based on the receipt of the game data, wherein:

receiving game data comprises receiving, from a game clock that functions independent of a time of day clock, data indicating that a specified portion of the game has been played; and de-activating, by one or more data processing apparatus, the beverage dispensing node comprises de-activating beer vending stations in a venue of the game in response to receipt of the data.

* * * * *